US008918732B2

(12) United States Patent
Danilov (10) Patent No.: US 8,918,732 B2
(45) Date of Patent: Dec. 23, 2014

(54) PROGRAM OBJECT PROPERTIES DEFINED BY OBJECT SPACE

(75) Inventor: Oleg Vladimirovich Danilov, Clayton, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 413 days.

(21) Appl. No.: 13/054,917

(22) PCT Filed: Aug. 9, 2008

(86) PCT No.: PCT/US2008/072728
§ 371 (c)(1),
(2), (4) Date: Jan. 19, 2011

(87) PCT Pub. No.: WO2010/019128
PCT Pub. Date: Feb. 18, 2010

(65) Prior Publication Data
US 2011/0126140 A1    May 26, 2011

(51) Int. Cl.
*G06F 3/0481* (2013.01)
*G06F 9/44* (2006.01)

(52) U.S. Cl.
CPC .................................. *G06F 9/4443* (2013.01)
USPC ........................................................ 715/767

(58) Field of Classification Search
USPC ............................................ 715/767, 800, 810
See application file for complete search history.

(56) References Cited

U.S. PATENT DOCUMENTS

| 5,237,654 | A | * | 8/1993 | Shackelford et al. | 715/804 |
|---|---|---|---|---|---|
| 5,283,561 | A | * | 2/1994 | Lumelsky et al. | 715/717 |
| 5,353,391 | A | * | 10/1994 | Cohen et al. | 345/619 |
| 5,481,740 | A | * | 1/1996 | Kodosky | 715/839 |
| 5,481,741 | A | * | 1/1996 | McKaskle et al. | 345/522 |
| 5,512,919 | A | * | 4/1996 | Araki | 345/156 |
| 5,519,866 | A | * | 5/1996 | Lawrence et al. | 717/162 |
| 5,555,354 | A | * | 9/1996 | Strasnick et al. | 345/427 |
| 5,758,122 | A | * | 5/1998 | Corda et al. | 717/125 |
| 6,233,730 | B1 | * | 5/2001 | Todd et al. | 717/108 |
| 6,526,569 | B1 | * | 2/2003 | Obin et al. | 717/140 |
| 6,532,471 | B1 | * | 3/2003 | Ku et al. | 1/1 |
| 6,701,485 | B1 | * | 3/2004 | Igra et al. | 715/210 |
| 7,577,938 | B2 | * | 8/2009 | Bent et al. | 717/113 |
| 7,598,956 | B2 | * | 10/2009 | Strawn et al. | 345/473 |
| 7,743,387 | B2 | * | 6/2010 | Smith et al. | 719/316 |
| 8,051,429 | B2 | * | 11/2011 | Williamson et al. | 719/315 |
| 8,225,221 | B2 | * | 7/2012 | Beran et al. | 715/762 |
| 2002/0122068 | A1 | * | 9/2002 | Tsuruoka | 345/810 |
| 2005/0060687 | A1 | * | 3/2005 | Ghazaleh et al. | 717/123 |

(Continued)

FOREIGN PATENT DOCUMENTS

EP    1802085 A1    6/2007

OTHER PUBLICATIONS

K. Vanderkimpen, et al. Flexible Objective Representation using Properties, Jun. 2007.
Van Dooren. Abstractions for Improving, Creating, and Reusing Object-Oriented Programming Languages, Jun. 2007.
Wikipedia.org, "Model-View-Controller", Internet Citation, Sep. 11, 2014, Retrieved from the Internet: URL: http://en.wikipedia.org/wiki/Model%E2%80%93view%E2%80%93controller.

(Continued)

*Primary Examiner* — Phenuel Salomon
(74) *Attorney, Agent, or Firm* — Hewlett-Packard Patent Department (57) ABSTRACT

A user-interface program includes a space that defines adoptable properties as a function of position in said logical space. Chameleon program objects adopt those properties as a function of their positions in the space. The chameleon objects on a display have appearances that correspond to their adopted properties.

14 Claims, 6 Drawing Sheets

(56) References Cited

U.S. PATENT DOCUMENTS

| | | | |
|---|---|---|---|
| 2005/0204311 A1* | 9/2005 | Kim | 715/823 |
| 2006/0143574 A1* | 6/2006 | Ito et al. | 715/800 |
| 2007/0130523 A1* | 6/2007 | Ku et al. | 715/746 |
| 2007/0271520 A1* | 11/2007 | Yee et al. | 715/746 |
| 2008/0134077 A1* | 6/2008 | Cheng et al. | 715/781 |
| 2008/0161940 A1* | 7/2008 | Gerwens et al. | 700/4 |
| 2008/0163218 A1* | 7/2008 | Ostermeier et al. | 718/101 |
| 2009/0055735 A1* | 2/2009 | Zaleski et al. | 715/700 |
| 2009/0276733 A1* | 11/2009 | Manyam et al. | 715/854 |
| 2010/0201695 A1* | 8/2010 | Hill et al. | 345/503 |
| 2010/0251108 A1* | 9/2010 | Chaudhri | 715/269 |

OTHER PUBLICATIONS

Steve Burbeck, "Applications Programming in SMalltak-80(TM): How to use Model-View-Controller (MVC)", Internet Citation, Mar. 4, 1997, pp. 1-11. Retrieved from the Internet: URL:http://www.cs.illinois.edu/users/smarch/st-docs/mvc.html.

MindTelligent, Inc., "Model View Controller (MVC) Architecture", Internet Citation, 2003, pp. 1-5, Retrieved from the Internet: URL:http://www.mindtelligent.com/pdf/mvc.pdf.

Microsoft, Inc., Model-View-Controller, Internet Citation, 2014, Retrieved from the Internet: URL: http://msdn.microsoft.com/en-us/library/ff649643.aspx.

\* cited by examiner

PROGRAM OBJECT PROPERTIES DEFINED BY OBJECT SPACE

BACKGROUND OF THE INVENTION

So that more people have access to computer resources, increasingly intuitive and appealing interfaces are being developed. These new interfaces tend to involve interactive and animated visual elements that move and change appearance under specified conditions. In addition, the devices that humans used to interact with a visual interface are being simplified so that a full range of activities must be achieved with a minimal variety of commands.

One relatively new interface, used for example in Windows Media Center available from Microsoft Corporation, moves selections relative to a focal position (as opposed to moving a cursor through a static list). As an object, e.g., a text string, approaches the focal position, it becomes more salient. For example, text font size may increase. Once an object reaches the focal position, its size may increase further and other features will change to emphasize it over other items on display. For example, the text in the focal position may acquire a shadow so that it seems to pop out of the two-dimensional display. As it moves past the focal position, it loses salience.

Such an interface is easy to operate using very simple controls. However, the programming underlying such an interface can be very complex. Object-oriented programming can be used to simplify the task relative to classical linear programming. For each object, the way it changes in appearance can be programmed. Common characteristics can be redefined for a class of objects so that common characteristics do not have to be defined for each individual object. Nonetheless, the programming for each object can be extensive, complex, and error-prone.

BRIEF DESCRIPTIONS OF THE DRAWINGS

The features and advantages of the invention as well as additional features and advantages thereof will be more clearly understood hereinafter as a result of a detailed description of a preferred embodiment of the invention when taken in conjunction with the following drawings in which.

DETAILED DESCRIPTION

The present invention provides severable object and space programming modules for an animated user interface. The space module defines "adoptable" characteristics that vary by position within a space. The object space includes "chameleon" objects, so named because they adopt characteristics of their environment in a manner attributed to their reptilian namesakes. The chameleon objects of the present invention include "adopted" properties that are defined by the corresponding adoptable properties of the incorporating space. Thus, for example, the transparency of a chameleon object can vary as it moves across a display—not because it is programmed to change in that way, but because it is programmed to behave as the incorporating space dictates. The same object in a different space can change in a different way, depending on the adoptable properties specified by that space.

The space and object modules are "severable" in the sense that a space module can be used with different object modules and an object module can be used with different space modules. The severable modules provide the advantages of simplicity, portability, and flexibility. Since programmers need to attend to only one module at a time, programming is simplified. This, in turn, yields savings for a given programming task, and permits more complex interfaces, e.g., with hundreds or thousands of animated objects. The invention provides portability in that copies of a space module can be used with different object modules to allow a common look and feel among application programs using the object modules. The invention provides flexibility in that a user can customize a user interface by activating a new space module without requiring any changes to an object module.

Figure 1:
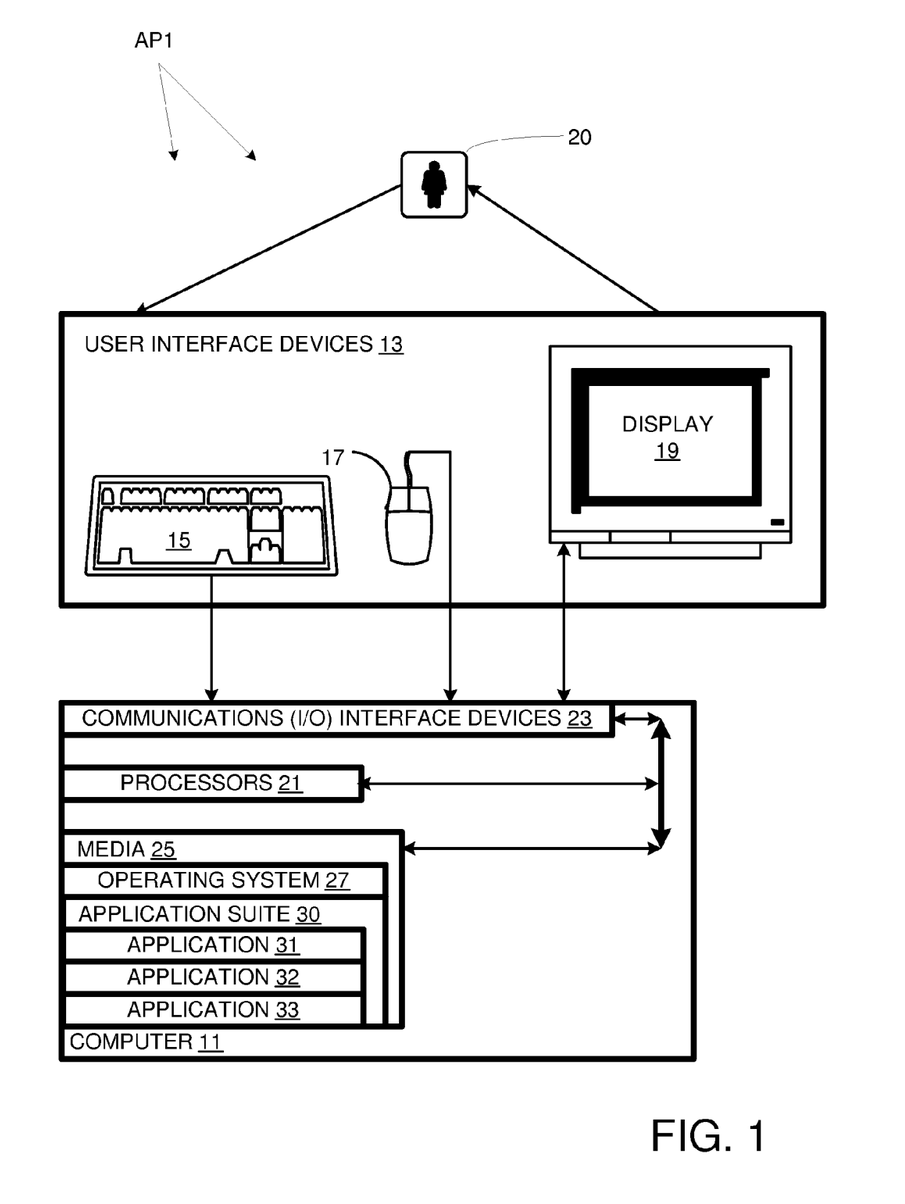
FIG. 1 is a schematic diagram of a computer system in accordance with an embodiment of the invention.

A computer system AP1 embodying the invention is depicted in FIG. 1. Computer system AP1 includes a computer 11 and user interface devices 13. User interface devices include a keyboard 15, a mouse 17, and an audio/visual display 19. A user 20 interacts with computer 11 via user interface devices 13. More specifically, user 20 responds to images presented on display 19 by inputting commands via keyboard 13 and mouse 15. In addition, display 19 can be a touchscreen display so user 20 can also input commands via display 19.

More generally, the invention provides for various arrangements of computers, input devices, and output devices. The invention provides for the computer, input devices, and the display to be separate devices. In addition, the invention provides for multiple instances of input devices (e.g., keyboard, mouse, digitizer, TV remote), multiple displays, or separate displays and speakers, and multiple computers. Alternatively, the computer and interface devices can be integrated, as in a cell phone, a personal digital assistant (PDA), a digital audio player (DAP), a tablet computer, or a TouchSmart computer (available from Hewlett-Packard Company).

Also, the invention provides for devices that integrate any two of the three 1) computer, 2) input device, and 3) display. For example, a computer built into a television with a separate remote control; an Atari ST computer (no longer available) with the computer built into a keyboard, but requiring a separate display; or a terminal (integrated display and user input device, with a separate computer).

Computer 11 includes processors 21, communications interface devices 23, and computer-readable storage media 25. Computer-readable media 25 stores programs, including an operating system 27 and an application suite 30. Application suite 30 includes application programs 31, 32, and 33. A well-known example of an application suite is Microsoft Office, which, at least in some versions, includes a word processing application, a spreadsheet application, and a presentation application. Other examples of application suites include Adobe Creative Suite and Kontakt Komplete (a virtual instrument suite available from Native Instruments). However, less integrated collections of applications are also considered suites. Since no commercially available suite of programs embodies the present invention, the missions for application 31-33 are left unspecified herein.

Processors 21 manipulate the data associated with operating system 27 and application suite 30 in accordance with instructions of those respective programs. Communications interface devices 23 provide for network communication as well as input/output functionality for user interface devices 13. For example, communications interface devices 23 can include a USB (Universal Serial Bus) port to which mouse 15 connects. For another example, communications interface devices 23 can include an infrared port and user interface devices 13 can include a television remote control.

Figure 2:
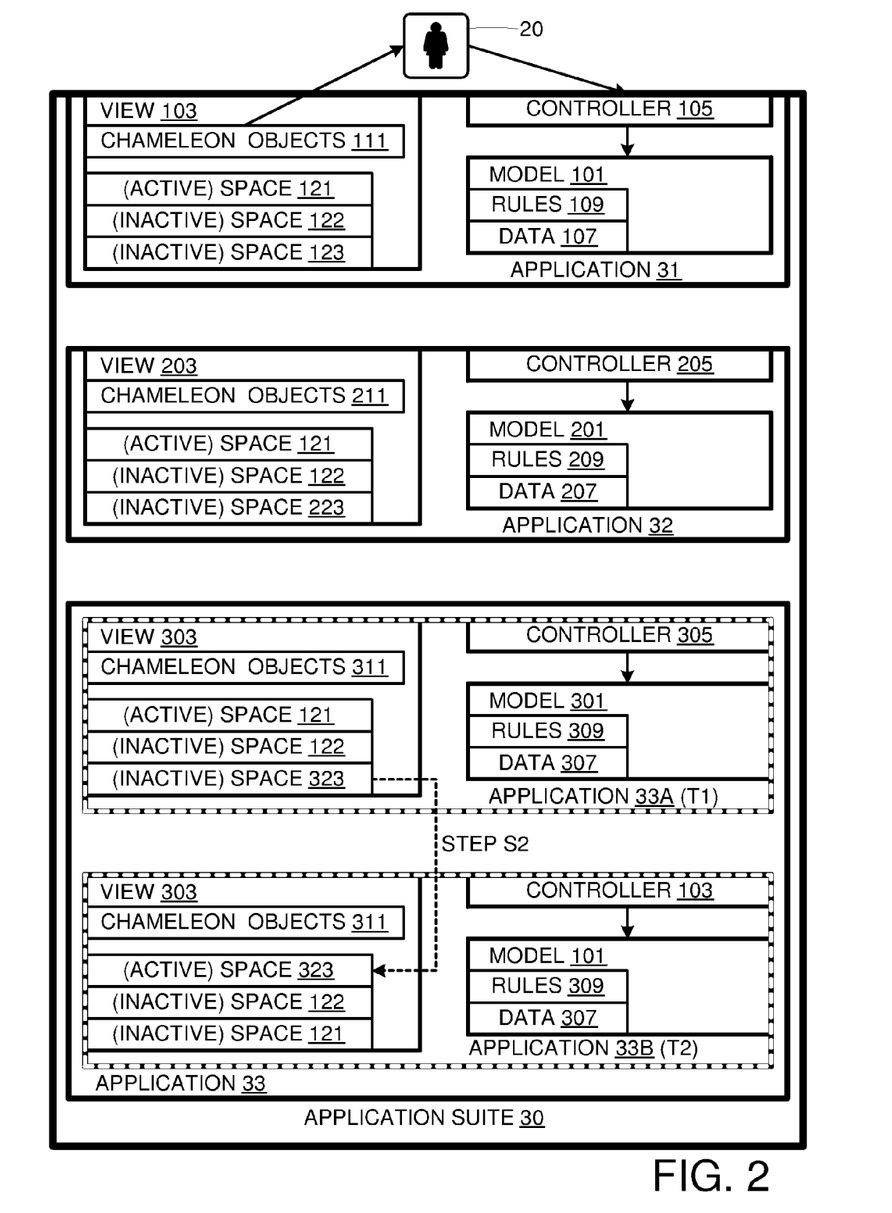
FIG. 2 is a schematic diagram of a suite of application programs as shown in FIG. 1.

Application suite 30 is represented in greater detail in FIG. 2, including constituent applications 31-33. Note that application 33 is represented at two different times T1 and T2 as applications 33A (for time T1) and 33B (for time T2). Applications 31-33 employ the same basic programming pattern, which is explained below first with respect to application 31.

Application 31 includes a model 101, a view 103, and a controller 105. Model 101 corresponds to the mission of application 31, while view 103 corresponds to the user interface. More specifically, model 101 includes domain-specific data 107 on which rules 109 of application 31 operate. Domain logic adds meaning to raw data (e.g., calculating whether today is the user's birthday, or the totals, taxes, and shipping charges for shopping cart items). Model 101 can use a persistent storage mechanism (such as a database) to store data related to the mission of application 31. View 103 renders the model into a user interface suitable for interaction. The invention provides for multiple views to exist for a single model for different purposes. Controller 105 processes and responds to events, typically user actions, and may invoke changes on the model.

Those skilled in the art may recognize that application 31, as described in the previous paragraph, employs a variant of the model-view-controller program architecture pattern. This approach to programming separates the underlying functionality of a program (the model) from the presentation to the user (the view). This modularity provides several advantages: programming simplicity, portability of the user interface, and customizability of the user interface. First, the programming task is simplified as one large task that is broken into separate more manageable tasks. Second, because it is not tied to the specific functionality of the program, the view can be ported to other programs with different functionality. This portability can be useful in allowing different applications, e.g., applications 31-33 can each employ a copy of a view so that they share a common "look and feel". Third, because the model is not tied to a given view, the view (aka "skin" or "theme") can be changed without changing the underlying functionality of the application. For example, several versions of Microsoft Windows allow a user to select a theme that governs the appearance of the desktop and other objects.

The present invention moves beyond prior-art model-view-controller architectural patterns by separating the view module into object and space submodules. Thus, for application 31, view 103 is divided into a chameleon object module or modules 111 and one or more space modules, including logical spaces 121, 122, and 123. As shown, logical space 121 is active, while logical spaces 122 and 123 are inactive so that they do not affect the user experience.

The architecture pattern of application 32 is basically the same as that for application 31. There are separate modules for a model 201, a view 203, and a controller 205. Model 201 includes its own rules 209 and data 207. View 203 includes chameleon objects 211, and logical spaces 121, 122, and 223. The first of these is active, while the last two are not. Spaces 121-122 are identical to the spaces of view 103, while space 223 is different. This illustrates that spaces may be shared or not between applications. For example, common spaces can be used for a common look and feel, while an interface tailored to an application might be preferred by power users of that application.

Likewise, the architecture pattern of application 33 parallels the patterns for applications 31 and 32. There are separate modules for a model 301, a view 303, and a controller 305. Model 301 includes its own rules 309 and data 307. View 303 includes chameleon objects 311, and logical spaces 121, 122, and 323. In application 33A, which is application 33 at time T1, logical space 121 is active, while logical spaces 122 and 323 are inactive. In application 33B, which is application 33 at a later time T2, space 323 is active, while logical spaces 121 and 122 are inactive. As explained further below, this user-controlled change in space is an example of the customization provided by the present invention. Note that logical space 121 of application 31, logical space 121 of application 32, and logical space 121 of application 33 are separate instances of the same logical space. While the invention is discussed in the context of application programs, it applies to other programs with animated user interfaces such as operating system 27.

The chameleon character of the objects is explained with reference to FIG. 3, which depicts logical space 121 while it is active at two different times T3 and T4. Logical space 121 can be considered a superset of presentation space 35, which closely corresponds to the display space viewed by user 20 on display 19. Logical space 121 is a superset of presentation space 35 in that some but not all objects in logical space 121 are represented in presentation space 35. For example, at time T3, logical space 121 includes chameleon text objects "finance" 41, "weather" 42, "food" 43, "travel" 44, "sports" 45, "news" 46, and "jobs" 47. Each of these objects represents a topic in which a user might be interested. At time T3, each of these objects has a position in logical space 121. All except for "finance" 41 and "jobs" 47 have logical-space positions that correspond to positions within presentation space 35. As a result, at time T3, the words "weather", "food", "travel", "sports", and "news" are visible on display 19, while "finance" and "jobs" are not.

Figure 3:
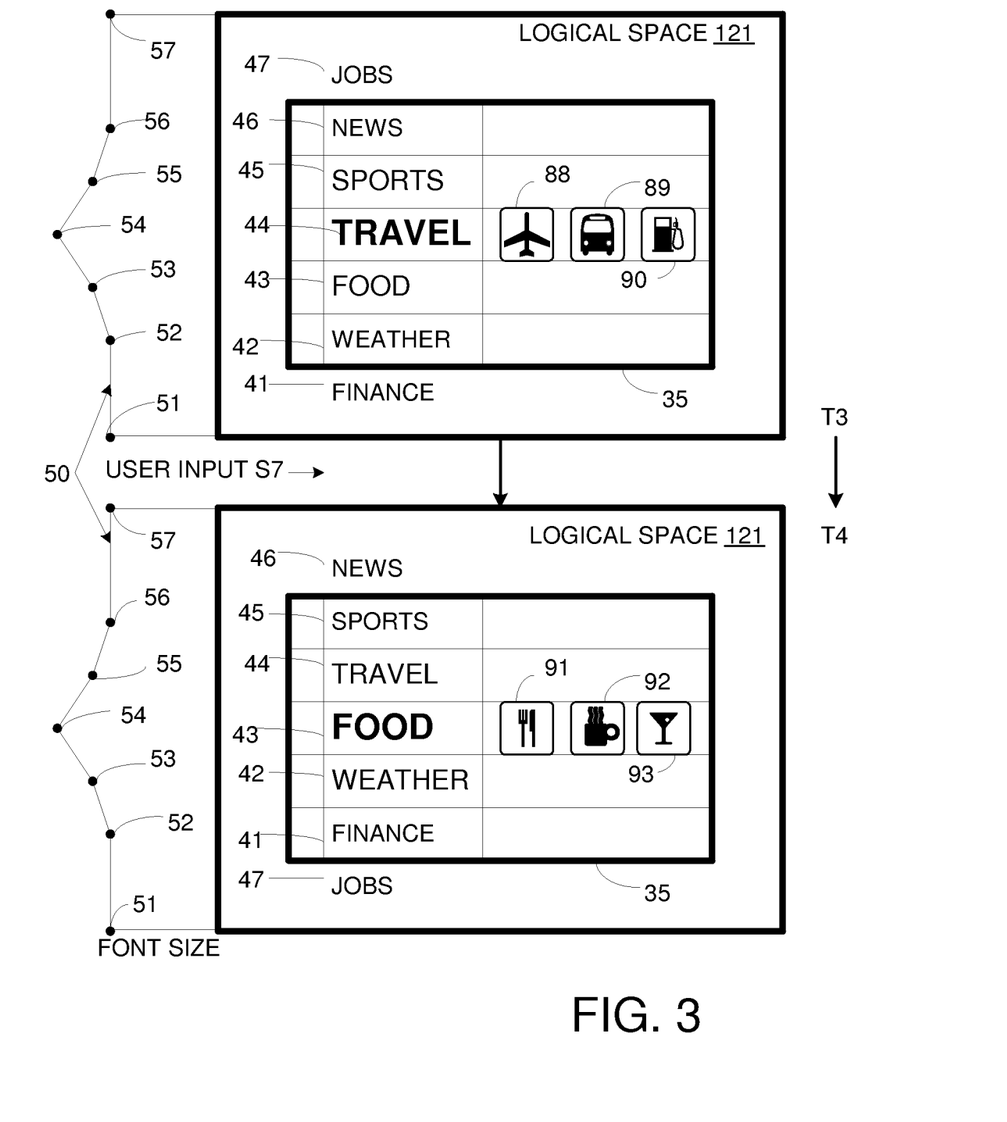
FIG. 3 shows a logical space of the computer system of FIG. 1 before and after a transition.
Figure 4:
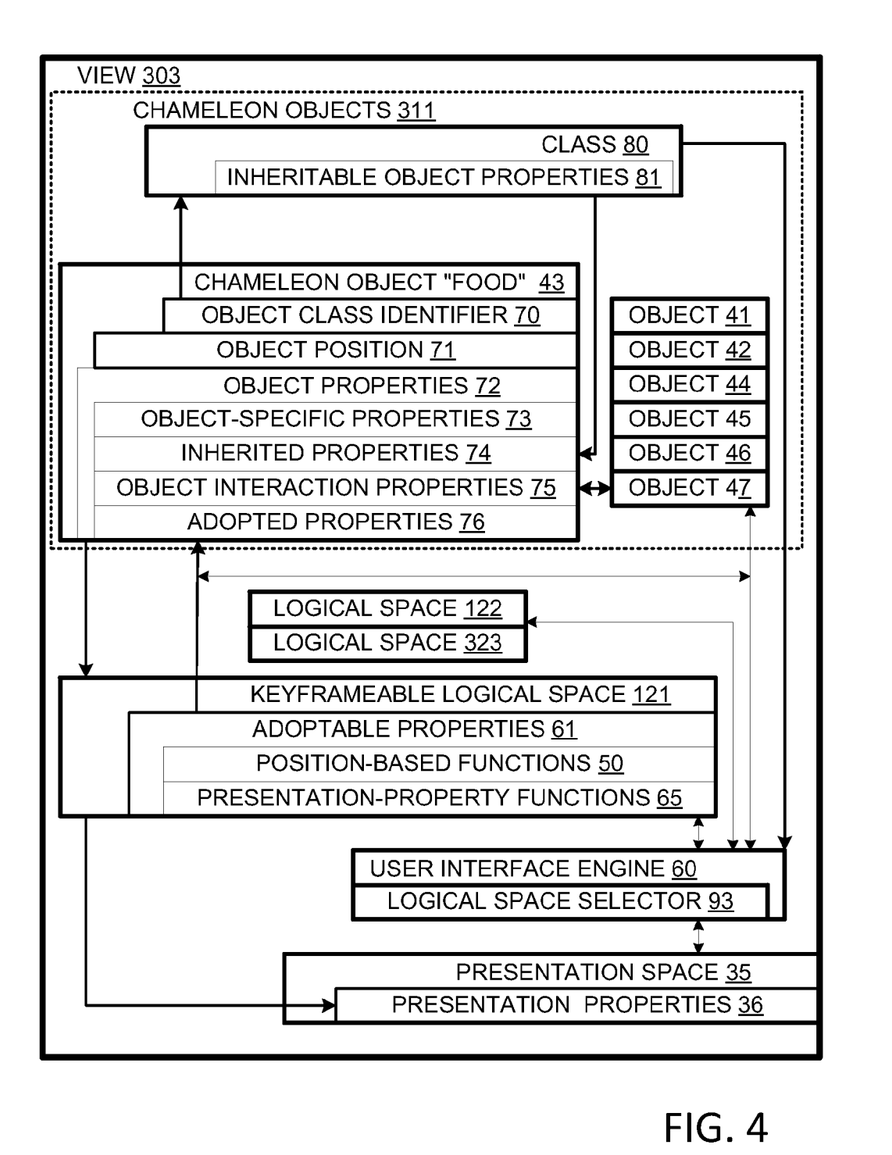
FIG. 4 is a schematic diagram of a view incorporating the logical space of FIG. 3 in accordance with an embodiment of the invention.

Each of these objects 41-47 has a default font size of 12 points and a normal font style, specified as inherited properties determined by inheritable object properties 81 of class 80, shown in FIG. 4. However, these default inherited values are overridden by adopted object properties 76, except where no value is given for an adopted property. Logical space 121 specifies font sizes for vertical positions 51-57 as indicated by font-size versus position graph 50. Graph points 51, 52, 56, and 57, shown in FIG. 3, correspond to 12-point fonts, graph points 53 and 55 correspond to 14-point fonts, and graph point 54 corresponds to a peak 18-point font size. For example, at time T3, text objects "food" 43 and "sports" 45 are at logical positions for which a 14-point font size is specified. Also, at T3, the text object "travel" 44 is at a position for which a font size of 18 points is specified and for which a bold font style is specified. Also, the position of "travel" 44 at time T3 specifies that icons (specified as object-specific properties) are to be displayed to the right of the center text object. For "travel" 44, the icons represent air travel 88, land travel 89, and fuel stations 90.

In response to a user input at step S7 (method ME1, FIG. 6), the text objects move "up" to the positions shown for time T4. Text objects "weather" 42, "food" 43, "travel" 44, and "sports" 45 move up in both logical space 121 and presentation space 35. Text object "news" 46 moves up in logical space 121, causing it to move off of presentation space 35, and thus does not appear on display 19 at time T4. Concomitantly, the text object "finance" 41 moves up in logical space 121 and into presentation space 35. The text object "jobs" 47 wraps around from the top of logical space 121 to the bottom of logical space 121, without appearing in presentation space 35 at time T3 or time T4.

Notably, text object "food" 43, which was displayed in 14-point font size at time T3 has grown by time T4 to 18 points and its style has changed from normal to bold as a function of its change of position. In addition, its subtopic icons corresponding to "dining" 91, "coffee" 92, and "drinks" 93 now appear instead of those associated with "travel" 44. Travel 44, in the meantime, has moved to a position that dictates a 14-point font size and a normal font style. Other displayed text objects have adopted font sizes and styles corresponding to their new positions at time T4.

The transition that occurs between times T3 and T4 could be, but need not be, instantaneous. In the illustrated case, the transition occurs over a predetermined time of 1 second, during which objects move smoothly from one topic position to the next. During the transition, font sizes are interpolated as indicated by graph 50. In other words, graph points 51-57 represent spatial key-frames that determine the way logical space 121 transitions from its form at time T3 to its form at time T4.

Those skilled in the art will realize that the visual behavior of the text objects of FIG. 3 can be achieved using conventional programming techniques. The modularity provided by the present invention achieves advantages analogous to those achieved by the modularity of model-view-controller programming architecture. First, programming is simplified by breaking down a view into separate submodules; this simplification facilitates scaling of an animated interface to include hundreds and thousands of animated objects. Second, different instances of the same background can be applied to different object hierarchies (e.g., associated with different applications) to achieve a common animated look and feel. Third, animation behavior can be changed and customized by changing a logical space without affecting the objects or the object hierarchy.

View 303 is shown in greater detail in FIG. 4. Chameleon objects 311, as represented in FIG. 2, include text objects 41-47 as well as an object class 80, which defines inheritable object properties 81. View 303 includes key-frameable logical spaces 121, 122, and 323, and a presentation space 35. Presentation space 35 determines what is presented on display 19. At any given time, presentation space 35 has presentation properties 36 that characterize what is to be displayed. For example, presentation properties 36 can include a bit-map image to be presented on display 19, which serves as a physical space. View 303 also includes a user interface engine 60, which is responsible for controlling object properties as a function of position and properties of those positions for spaces 121, 122, 323, and 35.

Figure 5:
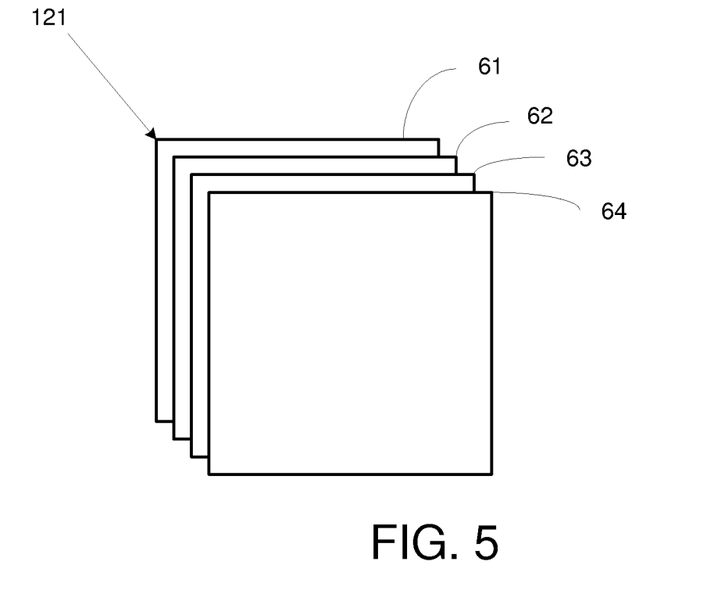
FIG. 5 is a schematic diagram of the logical space of FIG. 3 showing its layers.

As a first approximation, logical space 121, when active as in FIG. 3, can be thought of as a superset of presentation space 35 in that it defines not only positions within presentation space 35, but also positions that are beyond the boundaries of presentation space 35, as indicated in FIG. 5. In addition, logical space 41 can have dimensions beyond those of presentation space 35. For example, presentation space 35 is two-dimensional and logical space 121 includes the same two spatial dimensions plus a third dimension with layers 61-64, as shown in FIG. 5. Objects can be animated without changing positions on display 19 by moving between layers 61-64. The layers define keyframe positions and the appearance of objects moving from one frame to another can be interpolated to provide smooth transitions.

As shown in FIG. 4, view 303 provides a user interface engine 60 that governs the interactions among the objects and spaces of view 303. For example, logical space 121 can define "adoptable" object properties 61, including behaviors and static properties. These are object properties that are adopted by suitable chameleon objects 41-47. As shown for logical space 121, there are two basic types of adoptable object properties: 1) those defined directly by position-based functions 50; and 2) those defined by functions 65 of properties, e.g., background colors that vary with position. Engine 60 effects the adoption of adoptable properties by objects 31-37, reconciles conflicts between object properties, and interpolates properties during transitions between keyframed positions. Engine 60 communicates its property selections to objects 41-47.

Chameleon object 43, for example, specifies an object class identifier 70, a variable object position 71, and object properties 72. Object properties 72 include object-specific properties 73, inherited properties 74, object interaction properties 75, and adopted properties 76. These properties may refer to different attributes of an object (e.g., font size versus character represented) but also may refer to the same attribute and thus conflict.

Where properties conflict, e.g., an object-specific font size versus an adopted font size, engine 60 reconciles the conflict—e.g., treating the object specific font size as a default to be overridden by an adopted font size. However, the objects, classes, and spaces can all include reconciliation rules to resolve such conflicts as well. The combination rules so applied may combine properties in ways other than selecting one over the other. For example, at some display locations, attributes from logical space 121 can take precedence, while attributes from display 19 may take precedence at other display locations.

"Object-specific properties" are properties that are specific to a given object. Thus, objects 43 and 44 have different object-specific properties, e.g., specific text strings "food" versus "travel". Objects an belong to a class or class hierarchy from which objects inherit properties. Thus, view defines a class 80 for which inheritable object properties 81 are defined. Object 43 is a member of class 80 and thus its inherited properties 74 correspond to inheritable properties 81 of class 80. Other objects 41, 42, and 44-47 belonging to the same class share the same inherited properties. Objects can be programmed to interact in various ways; the rules that govern these interactions are described as object-interaction properties, e.g., object-interaction properties 75 of object 43.

In the foregoing example, object 43 adopts properties from a single logical space. However, engine 60 can also provide for adopting properties from multiple logical spaces, e.g., from presentation space 35, and from the physical (or "device") space corresponding to display 19. Of course, object-specific and inherited properties can also be position dependent.

It is the adopted properties that give an object its chameleon character. As object 43 moves in logical space 121, adopted properties 76 vary (directly or indirectly) as a function of position as explained above and further below with respect to FIG. 4.

Figure 6:
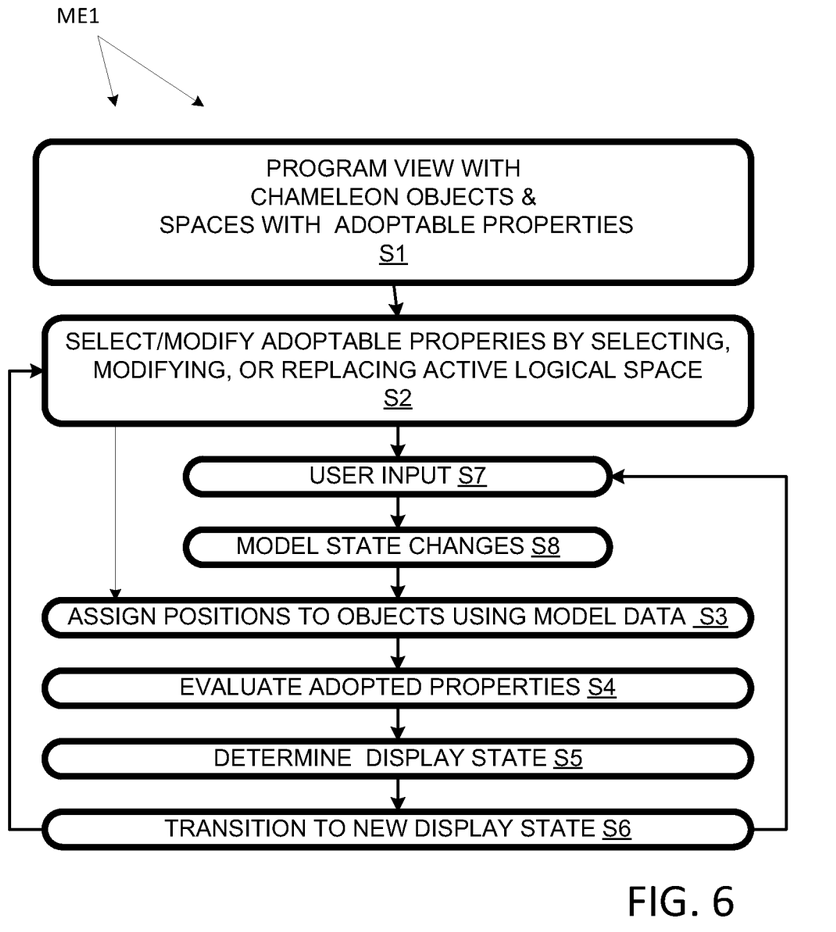
FIG. 6 is a flow chart of a method in accordance with an embodiment of the invention that can be implemented in the system of FIG. 1.

A method ME1 in accordance with an embodiment of the invention is flow-charted in FIG. 6. At step S1, an application, e.g., 33, is programmed with a view having separate object and space modules. The objects include chameleon animation objects having adopted properties and spaces that define corresponding adoptable properties.

One or more logical spaces is selected as an active space at step S2. In the absence of a user selection, a default may be selected. The invention provides for additional logical, presentation, and display spaces to be active. There may also be inactive logical spaces, subject to subsequent selection as active logical spaces.

Chameleon objects are assigned positions as a function of model data at step S3. There may be objects defined that are not assigned positions, but at least some of the available objects are assigned positions. The adopted properties of chameleon objects are evaluated at step S4. A corresponding new display state is determined at step S5; this new state can include new values for adopted properties. If the display state determined at step S5 is new, a transition is made to the new display state. This transition may be "key-framed" for smoothness, as explained above with reference to FIG. 3.

User 20 can interact with a display state, e.g., by manipulating user interface devices 13 at step S7. Controller 305 handles the user input and notifies model 301 of the user actions so that model 301 may change state at step S8, e.g., an object can be caused to move. This change of state triggers an iteration of steps S3-S6, resulting in a new display state.

At any time, a user can change a logical space so as to trigger an iteration of steps S2-S6, resulting in a new display state. For example, user 20 can access user interface engine 60, which includes a logical space selector 93. Logical space selector 93 allows a user to make a different logical space the current active logical space. For example, the transition in logical space from space 121 to 323, as shown in FIG. 2, can be effected using selector 93 of FIG. 4.

While the foregoing explains how transitions are implemented for objects moving in the presentation space, the present invention also provides for the same types of transitions for objects that remain stationary in the presentation space. Logical space 121 is three dimensional, as indicated in FIG. 5. It comprises multiple layers 61-64. Transitions can be effected for "stationary" objects by moving between layers. For smooth transitions, the layer positions can be treated as key-frames and intervening characteristics can be interpolated in a movement from one layer to the next.

While in the foregoing explanation, font size and style are used as examples of object properties, many other properties can be used in addition or instead. For example, attributes such as scale, transparency, text fill texture, drop shadow, and transparency can be assigned to screen positions. Thus, as chameleon objects move across the screen they assume video attributes from the space (chameleon effect), representing different steps of menu navigation.

Those skilled in the art will recognize that there are many ways to program software to achieve a given appearance for a user. The present invention removes much of the complexity involved in programming objects and object hierarchies by defining behaviors in the space itself. The reduced complexity reduces the number of programming errors, saving time and effort in diagnosing errors, and generating, distributing, and installing solutions. Also, changes in the presentation can be effected by modifying the logical space without changing the objects and the object hierarchy, which results in better and easier personalization.

Herein, "properties" includes both appearances and behaviors. Appearances tend to be defined by data, while behaviors tend to be defined by computer-executable code. Both can be defined as adoptable properties in a space as functions of spatial position.

In the illustrated embodiment, adopted properties are a function of adoptable properties defined by a logical space. The invention provides for multiple logical spaces to be used concurrently to defined object properties. For example, logical spaces can be used hierarchically or in parallel. Also, adopted properties can be determined using any combination of adoptable properties associated with logical, presentation or global, and display spaces.

For each space, there is at least one associated coordinate system. Herein, a "coordinate system" is a system for assigning an n-tuple of numbers or scalars to each point in an n-dimensional space. "Scalars" in many cases means real numbers, but, depending on context, can mean complex numbers or elements of some other commutative ring. Although a specific coordinate system is useful for numerical calculations in a given space, the space itself is considered to exist independently of any particular choice of coordinates. From this point of view, a coordinate on a space is simply a function from the space (or a subset of the space) to the scalars.

In the illustrated embodiments, the properties used by way of example were chosen in part because they are readily represented in black-and-white, while color and motion are not so readily represented in that medium. Color and transparency are a big part of most dynamic interfaces. The present invention provides for selecting object colors, transparency, and other visual effects (like masking, color mixing, inverse etc.) as a function of position and as a function of the color and texture of a background at a position. For example, an object can change color as it moves from block to block of a background so that the objects color coordinates and contrasts with the background color.

The separation of objects and spaces can be manifested in a number of ways. For example, the objects and spaces may be defined in different files, e.g., XML files. In other cases, the objects and spaces may be represented in different sections of a configuration file. Operationally, the ability to affect changes in object behavior by changing a space without changing the objects themselves is a characteristic of the invention.

The foregoing description, for purposes of explanation, has been described with reference to specific embodiments. However, the illustrative discussions are not intended to be exhaustive or to limit the invention to the precise forms disclosed. Many modifications and variations are possible in view of the disclosed teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A user-interface product comprising:
non-transitory computer-readable storage media encoded with a program of computer-executable instructions that, when executed by a processor, defines:
a first object space of positions, said first object space defining first adoptable properties as a function of said positions;
chameleon program objects including,
object-specific properties and first adopted properties, each of said objects having a respective position in said space, and
inherited properties inherited from an object class to which said chameleon objects belong, said inherited properties corresponding to inheritable properties the class is programmed to define; and
a user interface engine that, when executed by a processor, controls said first adopted properties as a function of position and values of first adoptable properties for those positions so that an adopted property of a chameleon object varies as said chameleon object moves in said object space;

wherein said program employs a model-view-controller architecture pattern and includes:
a model module that defines an underlying functionality of said program; and
a view module that defines a presentation to a user, said view module including object sub-modules and a first space submodule, the first-space submodule being programmed to define said first object space and said first adoptable properties, said space submodule being separate from said object submodules.

2. A product as recited in claim 1 wherein said first adopted properties are determined directly as a function of position in said space.

3. A product as recited in claim 2 wherein said functions are defined by key-frame values associated with a subset of the positions in said first object space, said functions being evaluated at positions between keyframes by interpolation.

4. A product as recited in claim 1 wherein said first adopted properties are determined as a function of properties of said first object space at a position of said object in said first object space.

5. A product as recited in claim 1 further comprising a second object space, said program providing for switching between said first object space and said second object space as the active space, said second space having second adoptable properties that are characterized by different functions of position than are the first adoptable properties of said first object space, said user interface engine controlling said first adopted properties as a function of position and values of said second adoptable properties at those positions when said second object space is active.

6. A product as recited in claim 1 wherein said chameleon program objects and said first object space are severable.

7. A product as recited in claim 1 wherein said chameleon objects further include object interaction properties, defined by the respective chameleon objects, that govern interactions among said chameleon objects.

8. A method comprising:
executing a program that employs a model-view-controller architecture pattern so as to
causing cause a program object to move in a first object space, the program object including inherited properties inherited from an object class to which said chameleon objects belong, said inherited properties corresponding to inheritable properties the class is programmed to define; and
as said program object is moved in the object space, change values of first adopted properties of said program object according to first adoptable properties specified by said first object space, said first adoptable properties being an indirect or direct function of position;
the program including,
a model module that defines an underlying functionality of said program; and
a view module that defines a presentation to a user, said view module including object sub-modules and a first space submodule, the first-space submodule being programmed to define said first object space and said first adoptable properties, said space submodule being separate from said object submodules.

9. A method as recited in claim 8 further comprising modifying or replacing said adoptable properties by modifying or replacing said object space.

10. A method as recited in claim 8 wherein at least one of said first adopted properties dominates or modifies an object-specific or inherited property of said program object.

11. A method as recited in claim 8 wherein said first adoptable properties are evaluated as a function of position in said first object space.

12. A method as recited in claim 8 wherein said first adoptable properties are evaluated as a function of presentation space properties that are a function of position in said first object space.

13. A method as recited in claim 8 further comprising:
causing said program object to move from said first position to said second position in a second object space; and
changing values of second adopted properties of said program object according to second adoptable properties associated with said second object space, said second adoptable properties being an indirect or direct second function of said position, said second function being different from said first function.

14. A method as recited in claim 8 further comprising:
causing an interaction between said program object and another object, said program object and said another object having interaction properties; and
governing said interaction according to said interaction properties.

* * * * *